Max Otto Wintterlin
Frist Ostwald
Dezsö Varga
INVENTORS.

BY
Masters, Ross & Masters

Max Otto Wintterlin
Frist Ostwald
Dezsö Varga
INVENTORS.

BY
Mestern, Ross & Mestern

United States Patent Office 3,396,741
Patented Aug. 13, 1968

3,396,741
SWITCHING VALVE FOR FLUID SYSTEM
Max Otto Wintterlin, Lohr (Main), and Fritz Ostwald, Buchschlag, Germany, and Dezsö Varga, Leamington Spa, England, assignors to Alfred Teves KG, Frankfurt am Main, Germany, a corporation of Germany
Filed Mar. 22, 1965, Ser. No. 444,505
Claims priority, application Germany, Dec. 17, 1963, T 25,277
10 Claims. (Cl. 137—115)

ABSTRACT OF THE DISCLOSURE

A switch valve for alternately connecting a hydraulic supply line from a pump to a pressure accumulator and another outlet wherein a pair of valve balls are connected by a rigid link for joint movement and are alternately engageable with respective seats between which the supply line opens, the balls being of different effective areas. The accumulator is connected with the seat of a large-diameter ball while the other outlet is provided with the seat engageable by the small-diameter ball. Magnetic and spring biasing means urges the balls into a first position in which the large-diameter ball engages its seat and exerts thereon a force which decreases toward a minimum value upon incipient displacement of the balls from this first position into a second position in which the second or small-diameter seat is unblocked. The large-diameter ball in the limiting second position forms a check valve from the accumulator.

---

Our present invention relates to a switching valve for hydraulic or pneumatic pressure systems, more particularly for a system wherein pressure fluid from a supply line is to be alternately directed to one of two outgoing lines in response to pressure changes in one of the latter lines, e.g. as generally described in commonly assigned application Ser. No. 378,215 filed June 26, 1964, by Hans-Christof Klein (now U.S. Patent No. 3,224,456).

Such a valve is issued, for example, in a hydraulic system whose fluid is delivered under pressure, generally by means of a suitable pump, from the supply line to a high-pressure discharge line which feeds a pressure accumulator as well as a load (e.g. a hydraulic motor) and which is to be disconnected from the supply line whenever the back pressure from the accumulator reaches a predetermined maximum; at this point the output of the supply source is switched to a bypass line, leading to a sump or reservoir at the inlet side of the pump, so that the fluid is recirculated until the accumulator pressure has dropped to a certain threshold value whereupon a switchover in the reverse direction reconnects the supply line with the tank. The latter, designed to maintain a steady fluid supply in the face of variable power demands, may be an expandable chamber or an open vessel adapted to feed the hydraulic fluid (e.g. oil) to the load under an elastic force and/or by gravity; in either case it is desirable that the switchover in response to a critical pressure change be carried out swiftly and without leakage of stored fluid into the bypass in an intermediate position of the switching valve.

It is, therefore, the general object of our present invention to provide a switching valve for the purpose described which operates virtually instantaneously, thus eliminating the need for special check valves which would otherwise be required in order to prevent the escape of fluid from the high-pressure discharge line to the low-pressure bypass during switchover.

A related object of our invention is to provide a switching valve of this type which will not tend to remain ineffectually between its two alternate operating positions.

In switching valves of the differential type it is possible to achieve a certain snap or toggle action, in response to pressure changes between two limits, by dividing the valve into two sections each forming a channel with a stepped valve seat to accommodate a respective valve body, the two bodies being ganged for joint displacement between two limiting positions. In one limiting position the first channel is open, or at least limitedly unblocked, to provide a throttling effect with a distinct pressure differential between the two sides of its valve body, while the second channel is closed; in the second limiting position the reverse is the case. The stepped valve seats have the function of blocking each channel not only in its respective limiting position but also over an adjoining range of positions corresponding to a fraction of the overall stroke length. Thus, as the seat obstructs part of the surface of the (preferably spherical) valve body upon contact therewith in its limiting position, the area of the valve body exposed to the pressure of the incoming fluid is sharply reduced at the very end of the closure stroke so that an increased pressure differential is available to maintain closure; conversely, as soon as the valve body begins to move away from its seat to unblock the channel, increased pressure from the supply source becomes instantly effective to accelerate the outward movement of the valve body. If this latter movement occurs in response to a rise in the back pressure of the delivery line, against a progressively increasing restoring force (usually that of a spring) tending to keep the delivery channel open and the bypass channel closed, the rising restoring force may nevertheless retard the completion of the stroke to let fluid leak back from the not yet fully closed delivery channel so that the system may remain indefinitely in this undesirable intermediate position.

It is, accordingly, a more specific object of our invention to provide an improved switching valve of the character just discussed wherein the above drawback is eliminated.

In conformity with our invention, the interlinked valve bodies of a two-section switching valve are provided with biasing means exerting upon these bodies a force, in a direction opposite the direction of displacement in response to pressure from the high-pressure discharge line, which decreases toward a minimum value upon incipient displacement of these bodies in the last-mentioned direction.

According to a more particular feature of our invention, the biasing force reaches its minimum value in an intermediate position of the valve bodies (advantageously in approximately the position in which the second valve body begins to unblock the bypass channel) and thereafter rises again with approach of the opposite limiting position, i.e. upon further unblocking of the biasing channel, to the magnitude necessary for the initiation of the subsequent restoring stroke. In the latter instance the biasing force can be the resultant of two component forces, i.e. a nonlinearly decreasing force (as seen in the bypass-opening direction of stroke) and a substantially linearly increasing force; the first force, advantageously, is produced by a magnet though it could also be produced by other means, such as a swinging weight, whereas the second force may be that of a metallic spring.

Because the effective field strength of a magnet drops off rather sharply with increasing separation of the two cooperating elements, the distance between the starting position (bypass closed) and position of minimum bias (bypass about to open) may be very small, e.g. several tenths of a millimeter, if a magnetic restoring force is used. For this reason it will be desirable in such cases to use only a relatively small valve body in the bypass channel and a relatively large valve body in the delivery channel, the latter body being of course the one directly subject to the controlling back pressure.

Our invention will be described in greater detail with reference to the accompanying drawing in which.

Figure 1:
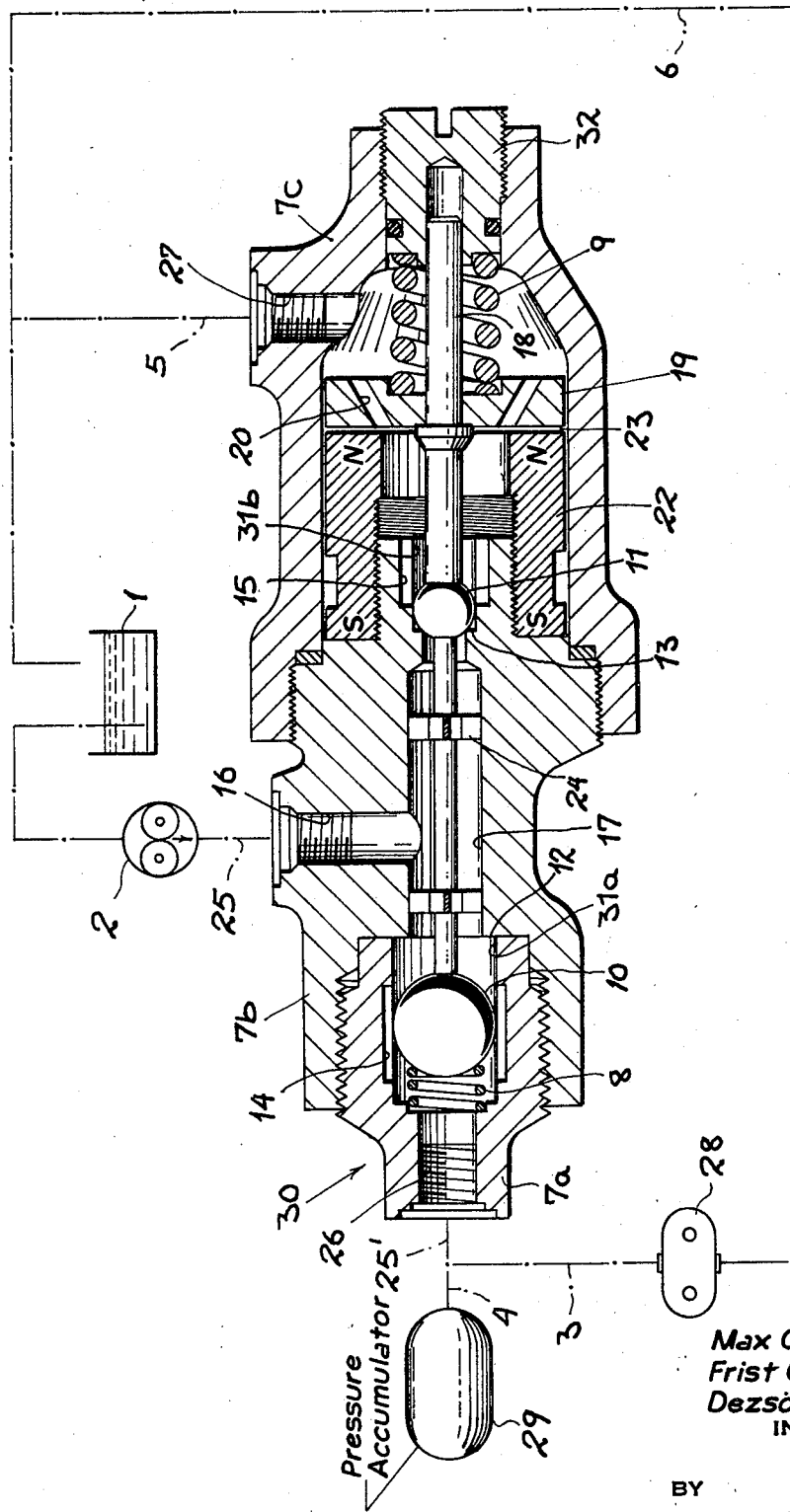
FIG. 1 is an axial sectional view of a valve embodying the invention, this figure also indicating diagrammatically the various other elements of a hydraulic system of which the valve forms a part.

In FIG. 1 we have shown at 1 a reservoir for a hydraulic liquid which is delivered at high pressure to a supply line 25 by means of a continuously operating pump 2. Line 25 terminates at an inlet port 16 of a switching valve 30 having two outlet ports 26 and 27. A contintion 25' of supply line 25 extends from outlet port 26 and splits into two branch lines 3 and 4, line 3 leading to a load 28 (e.g. a hydraulic motor) while line 4 extends to an accumulator 29, such as an inflatable bladder, adapted to build up a progressively increasing back pressure as long as the fluid-supply rate in line 25' exceeds the fluid-consumption rate of load 28. The return line 6 leads back from load 28 to reservoir 1 and is joined by a branch line 5 extending from outlet port 27 of valve 30.

The housing of valve 30 is divided into several portions 7a, 7b, 7c which are threadedly interconnected and of which the first two form respective valve sections with channels 31a, 31b, and valve bodies 10, 11. A stepped valve seat 12 in channel 31a and a similarly stepped valve seat 13 in channel 31b co-operates with the respective valve body 10, 11 for alternate blocking and unblocking of the channel. The valves bodies 10 and 11 are spherical and are rigidly interconnected by a rod 21 slidably held in guides 24 within a connecting channel 17 formed by housing portion 7b. The channels 31a, 31b are cylindrical with a diameter equal to that of the respective sphere 10 or 11 but with longitudinal grooves 14, 15 extending over part of the channel length to establish a throttled path for the hydraulic fluid around the respective sphere when the latter is in its unblocking position, i.e. the position illustrated for ball 10 in FIG. 1. When this ball moves toward the right, its equator contacts the solid peripheral wall portion of channel 31a before the ball comes to rest against its seat 12, hence the blocking of channel 31a occurs a short distance ahead of the alternate limiting position of the ganged valve bodies 10 and 11. Similarly, upon the subsequent return stroke the ball 11 blocks the channel 31b just before the system is restored to the limiting position illustrated in which this ball contacts its seat 13. Ball 10, however, is considerably larger than ball 11 so that the latter opens the channel 31b before ball 10 blocks the channel 31a upon a rightward movement of the valve bodies, such movement occurring under the urging of a biasing spring 8, supplementing the reaction force in line 25', against the action of another biasing spring 9 in housing portion 7c. Spring 9 bears upon a stationary plug 32 and a disk 19 on a stem 18 which rigidly extends from ball 11 as a continuation of linkage 21. Disk 19, which is formed with apertures 20 for the passage of hydraulic fluid from channel 31b toward port 27, consists of ferromagnetic material and constitutes an armature for a ring magnet 22 surrounding the valve section 11, 13, 31b within housing portion 7c. Magnet 22, which could be of either the permanent or the electromagnetic type, emits a constant flux exerting upon armature 19 and movable valve assembly 10, 11, 18, 21 an attraction supplementing the restoring force of compression spring 9, this magnetic force being at a maximum in the limiting position of FIG. 1 (in which the two magnetically co-operating elements 19 and 22 are separated from each other by a small air gap 23) and decreasing sharply with increasing relative separation of these two elements. This magnetic force, as is well known, follows a nonlinear law and decreases in proportion to the square of the distance; conversely, the resultant force of the two compression springs 8 and 9 may be regarded as varying substantially linearly within the limited stroke length of the displaceable valve assembly. This spring force, of course, will depend upon the coefficient of elasticity and the degree of stress of each spring 8, 9 and may be varied by adjustment of the screw-threaded plug 32.

Figure 2:
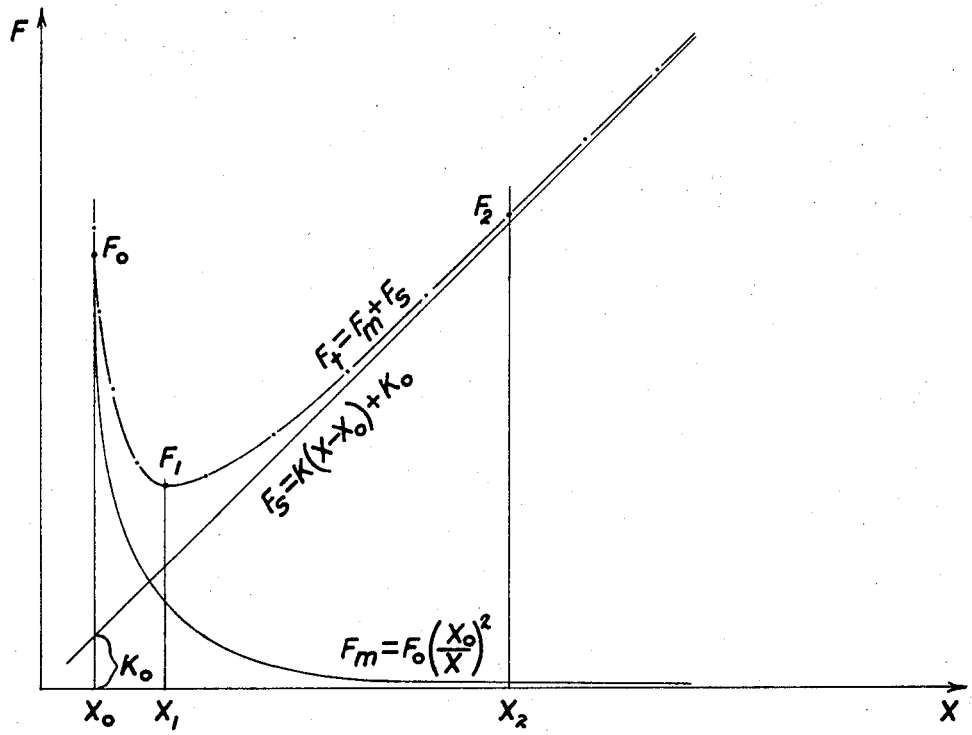
FIG. 2 is a graph useful for explaining the mode of operation of the valve of FIG. 1.

In FIG. 2 the restoring force F (considered positive in a direction opposing the accumulator pressure, thus toward the left in FIG. 1) has been plotted against displacement $x$ (taken as positive from left to right in FIG. 1). The magnetic force $F_m$ decreases nonlinearly according to the equation $$F_m = \frac{F_o}{(x-x_o)^2}$$

where $x_o$ is the minimum value of $x$ in the illustrated limiting position and $F_o$ represents the magnetic force F exerted across the narrow gap 23 in that limiting position. The combined spring force $F_s$ varies approximately linearly, within the range of displaceability of the movable assembly, according to the formula $$F_s = k(x-x_o) + k_o$$

where $k$ is the difference between the coefficients of elasticity of springs 9 and 8, $k_o$ being the value of $k$ in the position $x_o$. As indicated by the positive slope of curve $F_s$, the coefficient of elasticity of spring 9 exceeds that of spring 8; $k_o$ may, however, be positive, negative or zero, so long as the total restoring force $F_c = F_m + F_s$ remains positive throughout the range of displacement so as always to tend to hold open the feed channel 31a.

In operation, therefore, the valve 30 will occupy the position illustrated in FIG. 1 as long as the fluid pressure in accumulator 29 remains below a predetermined maximum; fluid then flows from pump 2 via channel 31a to load 18 and back through line 6 to reservoir 1, the bypass 5 being closed by the valve section 11, 13. As soon as the accumulator pressure reaches its upper limit, as determined by the adjustment of the degree of compression of spring 9 by plug 32 and/or by the field strength of magnet 22 if the latter is electrically energized, valve bodies 10 and 11 move toward the right so that ball 11 leaves its seat 13 whereby a larger effective surface area of this ball is exposed to the pressure of the pumped fluid in connecting channel 17. This increased exposure accelerates the rightward movement of the ganged valve bodies 10 and 11, along with armature 19, even as the increased spacing between this armature and the proximal face of ring magnet 22 results in a sharp drop of the component $F_m$ of the counteracting biasing force. Shortly thereafter, the equator of ball 11 enters the region of the grooves 15 of channel 31b so that the space 17 is vented toward the bypass 5 and the low-pressure side of the hydraulic system, there being now available a large pressure differential across the restricted passages 14 of channel 31a to counteract the small residual biasing force $F_1$ in this position $x_1$ (see FIG. 2). Ball 10 now moves rapidly to block the channel 31a and to engage its seat 12 whereby its own effective surface area is sharply reduced to increase the aforementioned pressure differential. The valve bodies 10 and 11 are now held in their alternate limiting position until enough fluid has been discharged from accumulator 29 through load 28 into return line 6 to reduce the back pressure in line 25' to an effective value less than that of the restoring force $F_2$ which, in this alternate limiting position $x_2$ (FIG. 2), has reached a value substantially greater than $F_1$ and is determined almost exclusively by the compression of spring 9. The magnitude of $F_2$ may be equal to, less than or greater than that of $F_0$.

As the assembly 10, 11, 18, 19, 21 begins to move leftward under the overriding pressure of biasing spring 9, ball 10 leaves its seat 12 so that the increase in its exposed area accelerates this motion. When the system passes again through position $x_1$, ball 11 begins to block channel 31b but the resulting buildup of a pressure differential thereacross is of no effect since at substantially the same instant the magnetic force $F_m$ comes into play to complete the stroke which reopens the delivery channel 31a. At the end of this stroke, again, the effective area of ball 11 is reduced through its partial obstruction by seat 13 with resultant decrease in the pressure differential across valve body 11.

Figure 3:
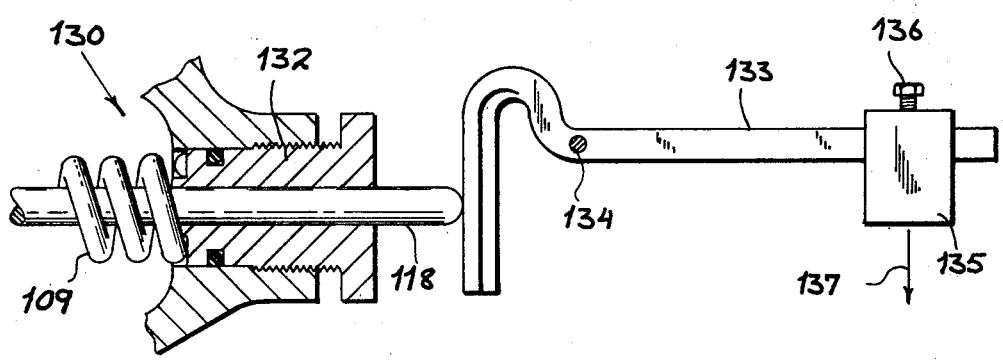
FIG. 3 is a fragmentary sectional view showing a modification of the valve of FIG. 1.

It will be apparent that the roles of fixed magnet 22 and movable armature 19 could be interchanged and that a force of other than magnetic character may be employed to produce a curve similar to that shown at $F_t$ in FIG. 2. Thus, we have illustrated in FIG. 3 the right-hand end of a partly modified switch valve 130 having a stem 118 guided within an adjustable plug 132 and partly surrounded by a compression spring 109, the projecting free end of stem 118 bearing upon the short arm of a lever 133 which has a fixed fulcrum 134 and has a weight 135 mounted on the free end of its substantially horizontal longer arm. When the stem 18 is moved toward the right against the force of spring 109, weight 135 swings upwardly in an arc centered on fulcrum 134 whereby the counteracting force exerted by it upon the stem 118 decreases nonlinearly; the magnitude of this force may be adjusted by a sliding of weight 135 along its lever arm to which it is releasably secured by a screw 136. Arrow 137, denoting the pull of gravity, is of course also representative of any other substantially constant force (e.g. that of a long tension spring) acting in the direction indicated.

It will be apparent that further modifications of the arrangements described and illustrated are possible without departing from the spirit and scope of our invention as defined in the appended claims.

We claim:

1. A switching valve for alternately directing pressure fluid from a supply line to one of two outgoing lines in response to pressure changes in one of said outgoing lines, comprising a first valve section forming a first channel with a first valve seat between said supply line and said one outgoing line; a first valve body movable in said first channel and engageable with said seat to block fluid flow through said first channel; a second valve section forming a second channel with a second valve seat between said supply line and the other outgoing line; a second valve body movable in said second channel and engageable with said second seat to block fluid flow through said second channel; linkage means interconnecting said valve bodies for joint and equal displacement between a first limiting position and a second limiting position, defined by respective engagement of said bodies with said seats, said seats being located between said bodies, said first channel being unblocked in said first and blocked in said second position, said second channel being blocked in said first and unblocked in said second position; and biasing means tending to maintain said bodies in said first position against the pressure in said one outgoing line, said biasing means exerting upon said bodies a force which decreases toward a minimum value upon incipient displacement of said bodies from said first position, said biasing means including a magnetic element and an armature element therefor, one of said elements being rigid with said linkage means, the other of said elements being fixedly disposed for coaction with said one element in said first position, said supply line opening into said channels between said seats, said first body having a relatively large effective surface area and said second body having a relatively small surface area.

2. A switching valve for alternately directing pressure fluid from a supply line to a high-pressure discharge line and a low-pressure bypass line in response to pressure changes in said discharge line, comprising a first throttle-valve section forming a first channel between said supply line and said discharge line; a first valve body movable in said first channel; a second throttle-valve section forming a second channel between said supply line and said bypass line, a second valve body movable in said second channel; linkage means interconnecting said valve bodies for joint displacement between a first limiting position and a second limiting position, said first channel being limitedly unblocked in said first and blocked in said second position, said second channel being blocked in said first and limitedly unblocked in said second position; and biasing means tending to maintain said bodies in said first position against the pressure in said discharge line, said biasing means exerting upon said bodies a force which decreases toward a minimum value upon incipient displacement of said bodies from said first position and thereupon against increases with approach of said second position, said biasing means including a magnetic element and an armature element therefor, one of said elements being rigid with said linkage means, the other of said elements being fixedly disposed for coaction with said one element in said first position, said biasing means further including spring means stressed in aiding direction with the field of said magnetic element, said magnetic element being a ring magnet fixedly mounted in one of said channels, said armature element being an apertured disk displaceable in said one channel on the side of the associated valve body remote from said supply line.

3. A valve as defined in claim 2 wherein said spring means includes an aiding compression spring in said one channel and a counteracting compression spring in the other channel.

4. A valve as defined in claim 2 wherein each of said channels is provided with a stepped seat between the respective valve body and said supply line, each channel being completely blocked by coaction of the corresponding seat and body in a respective limiting position and over a fractional stroke length therebeyond, the area of the valve body exposed to incoming fluid from said supply line being reduced by said stepped seat in the respective limiting position.

5. A valve as defined in claim 4 wherein said fractional stroke length and exposed area are relatively large in the case of said first body and relatively small in the case of said second body.

6. A valve as defined in claim 5 wherein said valve bodies are substantially spherical.

7. A valve as defined in claim 5 wherein said force reaches its minimum value in an intermediate position of said bodies separated from said first limiting position by a distance substantially equal to said fractional stroke length of said second body.

8. A valve as defined in claim 7 wherein said distance measures several tenths of a millimeter.

9. A valve as defined in claim 2 wherein said elements are separated from each other by a narrow gap in said first position.

10. A valve as defined in claim 1 wherein said seats are stepped with each channel being completely blocked by coaction of the corresponding seat and body in a respective limiting position and over a fractional stroke length therebeyond, the area of the valve body exposed to incoming fluid from said supply line being reduced by said stepped seat in the respective limiting position, said fractional stroke length and exposed area being relatively large in the case of said first body and relatively small in the case of said second body.

References Cited

UNITED STATES PATENTS

| | | | |
|---|---|---|---|
| 2,313,564 | 3/1943 | Manly. | |
| 2,545,712 | 3/1951 | Stevenson | 137—153 |
| 2,811,979 | 11/1957 | Presnell | 251—65 X |
| 2,846,850 | 8/1958 | Hall | 137—118 |
| 3,224,456 | 12/1965 | Klein | 137—115 |
| 3,270,763 | 9/1966 | Kiefer | 251—65 X |

WILLIAM F. O'DEA, *Primary Examiner.*

W. WRIGHT, *Assistant Examiner.*